US012526587B2

(12) United States Patent
Song

(10) Patent No.: US 12,526,587 B2
(45) Date of Patent: Jan. 13, 2026

(54) HEARING DEVICE, AND METHOD FOR ADJUSTING HEARING DEVICE

(71) Applicant: Olive Union, Inc., Tokyo (JP)

(72) Inventor: Myung Geun Song, Tokyo (JP)

(73) Assignee: Olive Union, Inc., Tokyo (JP)

( * ) Notice: Subject to any disclaimer, the term of this patent is extended or adjusted under 35 U.S.C. 154(b) by 510 days.

(21) Appl. No.: 18/008,000

(22) PCT Filed: Jun. 4, 2020

(86) PCT No.: PCT/JP2020/022129
§ 371 (c)(1),
(2) Date: Jun. 9, 2023

(87) PCT Pub. No.: WO2021/245883
PCT Pub. Date: Dec. 9, 2021

(65) Prior Publication Data
US 2024/0040322 A1 Feb. 1, 2024

(51) Int. Cl.
*H04R 25/00* (2006.01)

(52) U.S. Cl.
CPC .................................... *H04R 25/50* (2013.01)

(58) Field of Classification Search
CPC ................................ H04R 25/00; H04R 25/50
See application file for complete search history.

(56) References Cited

U.S. PATENT DOCUMENTS 11,690,428 B2 * 7/2023 Chawan ................. A45C 11/24 381/380

2007/0104343 A1 * 5/2007 Bengtsson ........... H04R 25/305 381/322

(Continued)

FOREIGN PATENT DOCUMENTS

| | | | |
|---|---|---|---|
| JP | 2012511271 | A | 5/2012 |
| JP | 2019195179 | A | 11/2019 |
| WO | 2013069556 | A1 | 5/2013 |

OTHER PUBLICATIONS

International Search Report, International Application No. PCT/JP2020/022129, dated Aug. 21, 2020.

*Primary Examiner* — Suhan Ni
(74) *Attorney, Agent, or Firm* — David L. Nocilly; Bond Schoeneck & King, PLLC

(57) ABSTRACT

The present invention provides a hearing device and a method for adjusting a hearing device with which adjustments are performed in real-time in accordance with sound (in particular, sound in the surrounding environment) input into the hearing device, thereby enabling the input sound to be finely adjusted and output to a user. The hearing system includes a hearing device, and a rechargeable battery device which is connected to the hearing device by way of a network and which accommodates the hearing device, wherein the hearing device is provided with: an input unit which acquires sound data from the outside and sound data from another device; a communication unit which transmits the sound data from the outside and the sound data from the other device to the battery device, and receives a parameter set generated by the battery device on the basis of a result obtained by adjusting the sound data; and an output unit which outputs the adjusted sound data to the user as sound, on the basis of the parameter set.

5 Claims, 9 Drawing Sheets

(56) References Cited

U.S. PATENT DOCUMENTS

| | | | | |
|---|---|---|---|---|
| 2014/0314245 | A1* | 10/2014 | Asada | G10K 11/17821 381/71.6 |
| 2015/0162770 | A1* | 6/2015 | Choi | A61L 2/24 34/88 |
| 2016/0100261 | A1* | 4/2016 | Shennib | H04R 25/554 381/323 |

* cited by examiner

HEARING DEVICE, AND METHOD FOR ADJUSTING HEARING DEVICE

TECHNICAL FIELD

The present invention relates to a method for adjusting a hearing device and a hearing device.

Conventionally, there are hearing devices such as hearing aids and sound collectors. Users whose hearing is congenitally or acquired are amplified by using a hearing device to amplify the input sound and compensate for the reduced hearing.

BACKGROUND ART

For example, patent document 1 discloses a hearing aid that adjusts the amplification amount or the like of the sound input according to the user operation.

International Patent Publication WO2014/010165 A1

However, in the hearing aid disclosed in Patent Document 1, the mode change according to the user operation (for example, walking, sleeping, eating, etc.) is only disclosed, and the surrounding environment (for example, an environment with a large ambient sound and noise such as a living room or a train home, an environment where ambient sound and noise is small, etc.) is not considered.

Further, the mode according to the user operation is changed, for example, by pressing a button. This is not a suitable mode change method when a mode change method is not so problematic in the case of mode change according to user operation (for example, walk, bedtime, meal, etc.) that does not change frequently, but when a more detailed mode change is desired for a situation with many changes as described above.

In addition, there is a need to provide hearing devices with new functions useful for various users and new business models using hearing devices.

DETAILED DESCRIPTION OF THE INVENTION

Technical Problem

Therefore, the present invention provides a method for adjusting the hearing device and the hearing device that can finely adjust the input sound and output it to the user by adjusting in real time according to the sound input to the hearing device (especially the sound of the surrounding environment), providing a hearing device having a new function useful for the user; The purpose of this program is to provide a new business model using hearing devices.

Technical Solution

In one aspect of the present invention, it is connected to the hearing device via a hearing device and a network, stores the hearing device, and has a battery device that can be charged, and the hearing device includes an input unit for acquiring sound data from the outside and sound data from other devices; A communication unit that transmits sound data and sound data from other devices from the outside to the battery device and receives a parameter set generated based on the result of adjusting the sound data with the battery device, and an output unit for outputting adjusted sound data as sound to the user based on the parameter set.

Advantageous Effects of the Invention

According to the present invention, by adjusting in real time according to the sound input to the hearing device (in particular, the sound of the surrounding environment), it is possible to finely adjust the input sound and output it to the user, and the user is always in an easy-to-hear state. Furthermore, it is possible to provide hearing devices with new functions useful to users and new business models using hearing devices.

BEST MODE

Hereinafter, embodiments of the present invention will be described with reference to drawings. Note that the embodiment described below does not unreasonably limit the content of the present disclosure described in the claims, and not all of the components shown in the embodiment are essential components of the present disclosure. Alternatively, in the accompanying drawing, the same or similar elements are accompanied by the same or similar reference codes and names, and overlapping descriptions of the same or similar elements may be omitted in the description of each embodiment. Furthermore, the features shown in each embodiment can also be applied to other embodiments as long as they do not contradict each other.

The First Embodiment

Figure 1:
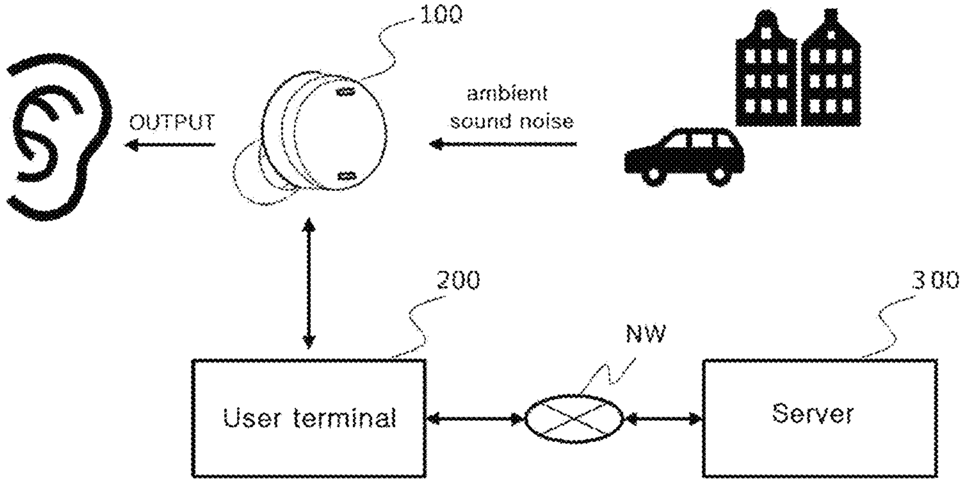
FIG. 1 is a block configuration diagram showing the first embodiment of the present disclosure.

FIG. 1 is a block configuration diagram showing the first embodiment of the present invention. In the first embodiment, for example, a hearing device 100 used by the user, a user terminal 200 owned by the user, and a server 300 in which the user terminal 200 is connected via the network NW. The network NW is composed of the Internet, intranet, wireless LAN (Local Area Network), WAN (Wide Area Network), etc.

For example, the hearing device 100 performs volume increase or decrease, noise cancellation, gain (amplification amount), and the like for the input sound, and executes various functions mounted. Further, the hearing device 100 provides acquired information such as data related to the input sound (in particular, the sound of the surrounding environment) to the user terminal 200.

The user terminal 200 is a user-owned terminal, for example, an information processing device such as a personal computer or a tablet terminal, but may be configured with a smartphone, a mobile phone, a PDA, or the like.

The server 300 is a device that transmits and receives information to the user terminal 200 via a network NW and computes the received information, for example, a general-purpose computer such as a workstation or personal computer, or may be logically realized by cloud computing. In the present embodiment, one is exemplated as a server device for convenience of explanation, but may be a plurality of units, not limited thereof.

Figure 2:
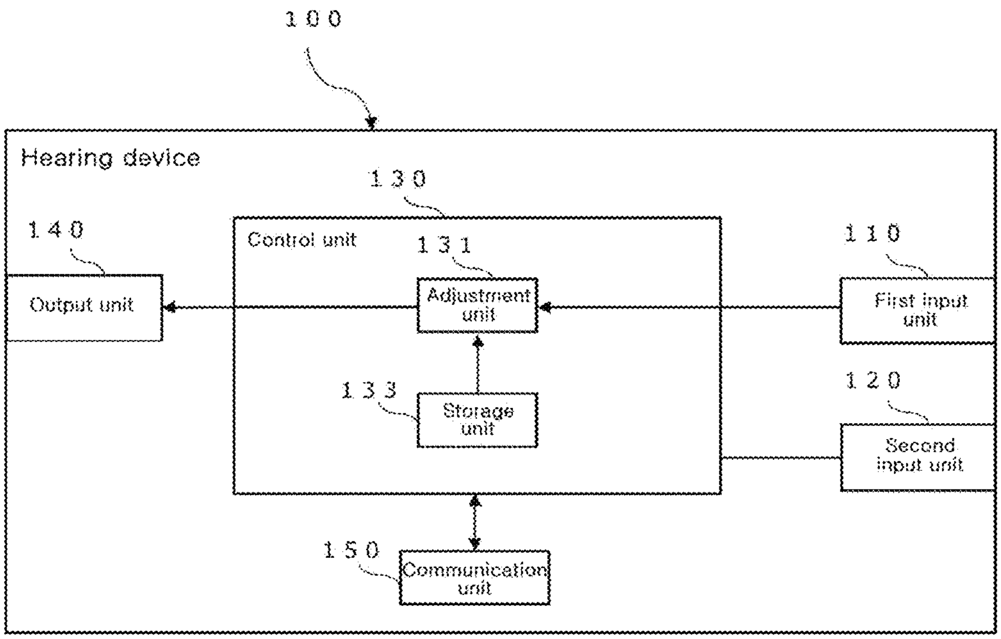
FIG. 2 shows the hearing device 100.

FIG. 2 is a functional block configuration diagram of the hearing device 100 of FIG. The hearing device 100 comprises a first input unit 110, a second input unit 120, a control unit 130, and an output unit 140 and a communication unit 150. The control unit 130 comprises an adjustment unit 131 and a storage unit 132. Further, although not shown, various sensors such as touch sensors may be provided, and the hearing device 100 may be operated by directly tapping or the like.

The first input unit 110 and the second input unit 120 are, for example, a microphone and an A/D converter (not shown). The first input unit 110 is disposed, for example, on the side close to the user's mouth, in particular acquires audio including the user's voice and converts it into a digital signal, and the second input unit 120 is disposed on a side far from the user's mouth, for example, in particular, the surrounding sound including the surrounding ambient sound is acquired and converted into a digital signal. In the first embodiment, it was a configuration having two input portions, but is not limited there to, for example, one may be one, or may be three or more plurality.

The control unit 130 controls the overall operation of the hearing device 100, and is composed of, for example, a CPU (Central Processing Unit). The adjustment unit 131 is, for example, DSP (Digital Sound Processor), for example, in order to make the received voice from the first input more audible, the DSP is adjusted by the parameter set stored in the storage unit 132, and more specifically, the gain (amplification amount) is adjusted for each plurality of predetermined frequencies (eg, 8 channels and 16 channels). The storage unit 132 may store a set of parameters set by a test such as initial setting, or a parameter set based on the analysis results described later may be stored. These parameter sets may be used alone for adjustment by the adjustment unit 131 or may be used in a composite manner.

The output unit 140 is, for example, a speaker and a D/A converter (not shown), and for example, the sound acquired from the first input unit 110 is output to the user's ear.

For example, the communication unit 150 transmits ambient sound data acquired from the second input unit 120 and/or audio data acquired from the first input unit 110 to the user terminal 200, and ambient sound data and/or voice sound data (hereinafter collectively referred to as "sound data"). A parameter set based on the result as the analysis is received from the user terminal 200 and transmitted to the storage unit 132. The communication unit 150 may be a near-field communication interface of Bluetooth® and BLE (Bluetooth Low Energy), but is not limited thereto.

Figure 3:
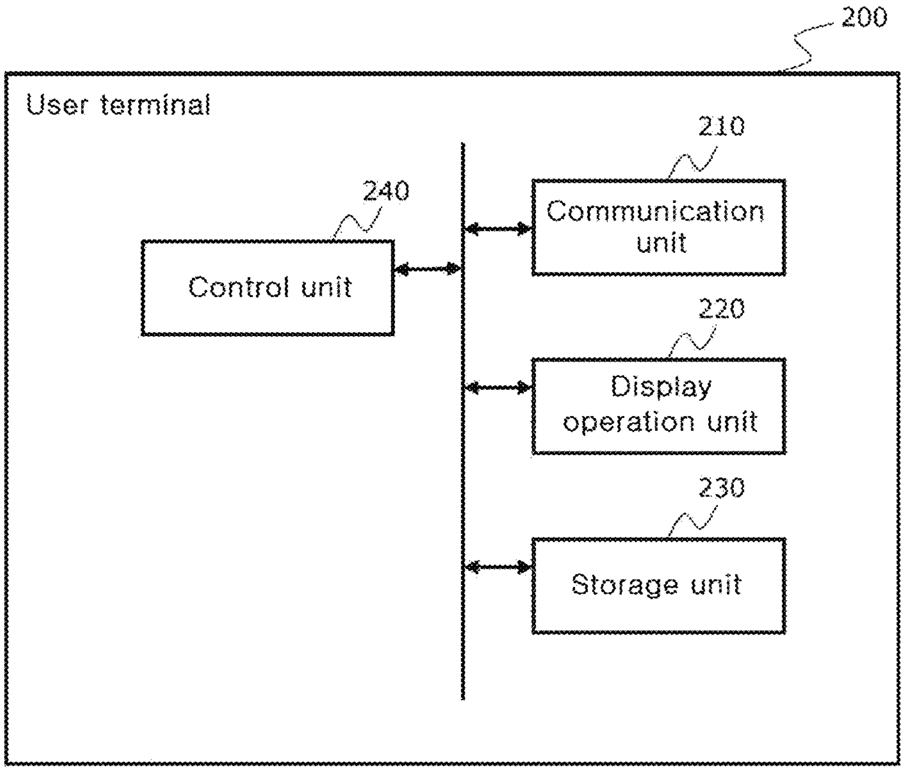
FIG. 3 is configuration diagram showing the user terminal 200.

FIG. 3 is a functional block configuration diagram showing the user terminal 200 of FIG. The user terminal 200 comprises a communication unit 210, a display operation unit 220, a storage unit 230, and a control unit 240.

The communication unit 210 is a communication interface for communicating with the server 300 via the network NW, and communication is performed according to a communication agreement such as TCP/IP. When using the hearing device 100, the user terminal 200 is preferably in a state where the hearing device 100 can be communicated at least normally with the server 300 so that the hearing device 100 can be adjusted in real time.

The display operation unit 220 is a user interface used for displaying text, images, and the like according to the input information from the control unit 240, and when the user terminal 200 is configured with a tablet terminal or a smartphone, it is composed of a touch panel or the like. The display operation unit 220 is activated by a control program stored in the storage unit 230 and executed by a user terminal 200 that is a computer (electronic computer).

The storage unit 230 is composed of a program for executing various control processes and each function in the control unit 240, input information, and the like, and consists of RAM, ROM, or the like. Further, the storage unit 230 temporarily remembers the communication contents with the server 300.

The control unit 240 controls the overall operation of the user terminal 200 by executing the program stored in the storage unit 230, and is composed of a CPU, GPU, or the like.

Figure 4:
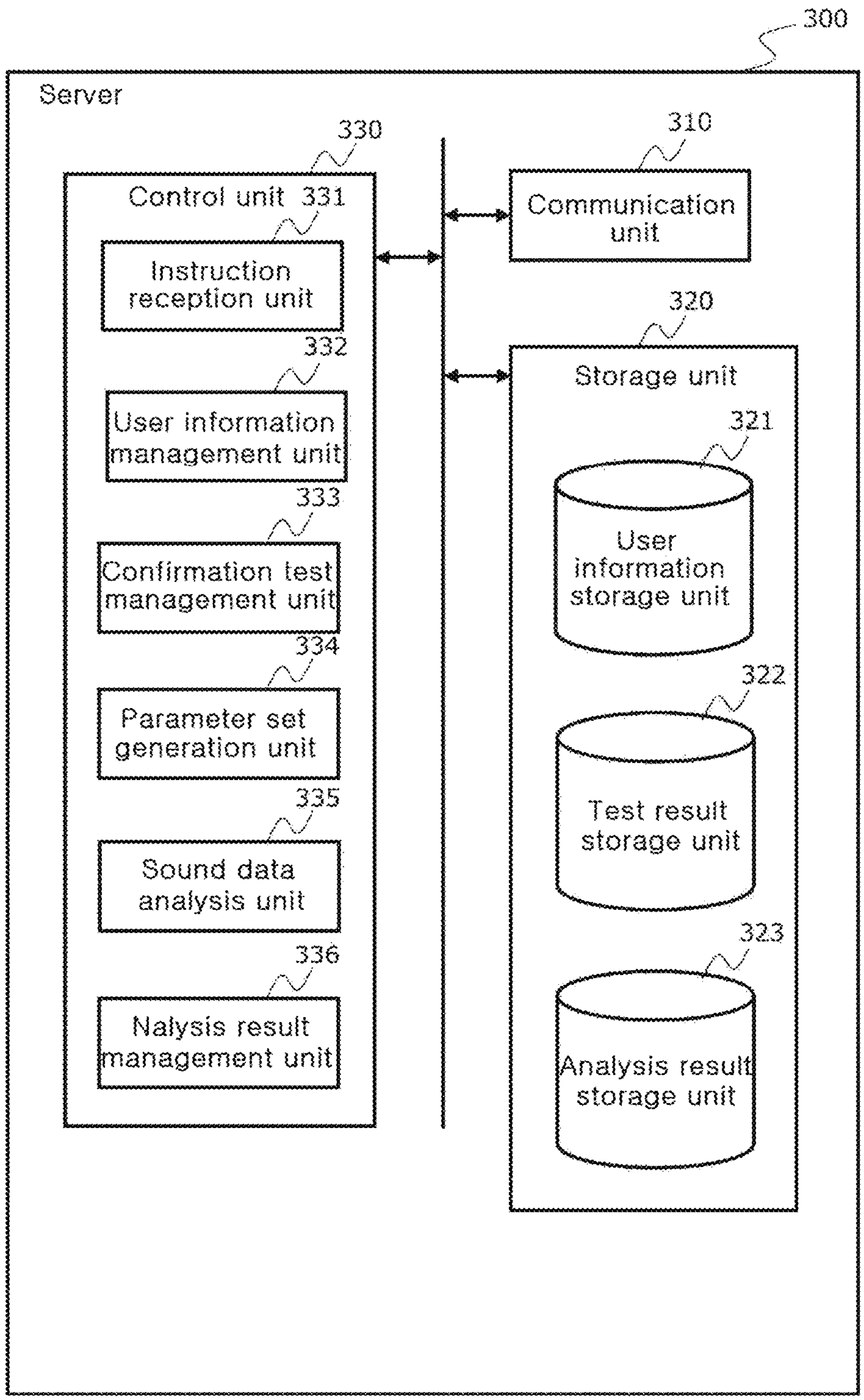
FIG. 4 is a function block configuration diagram which shows the server 300.

FIG. 4 is a functional block configuration diagram of the server 300 of FIG. The server 300 comprises a communication unit 310, a storage unit 320, and a control unit 330.

The communication unit 310 is a communication interface for communicating with the user terminal 200 via the network NW, and communication is performed by communication conventions such as TCP/IP (Transmission Control Protocol/Internet Protocol).

The storage unit 320 is a program for executing various control processes, a program for executing each function in the control unit 330, input information, and the like, and is composed of RAM (Random Access Memory), ROM (Read Only Memory), and the like. Further, the storage unit 320 has a user information storage unit 321 that stores user-related information (for example, setting information of the hearing device 100) that is various information related to the user, a test result storage unit 322, a test result storage unit 322, an analysis result storage unit 323, and the like. Furthermore, the storage unit 320 can temporarily store information that communicates with the user terminal 200. A database (not shown) containing various information may be constructed outside the storage unit 320.

The control unit 330 controls the overall operation of the server 300 by executing a program stored in the storage unit 320, and is composed of a CPU (Central Processing Unit) and a GPU (Graphics Processing Unit). As a function of the control unit 330, the instruction reception unit 331 that accepts instructions from the user, the user information management unit 332 that refers to and processes user-related information which is various information related to the user, performs a predetermined confirmation test, refers to the test result, processes, analyzes the test result of the confirmation test, and the test result of the confirmation test, It has a parameter set generation unit 334 for generating a parameter set, a sound data analysis unit 335 for analyzing input sound data, referencing and processing analysis results, and having an analysis result management unit 336, and the like. The instruction reception unit 331, the user information management unit 332, the confirmation test management unit 333, the parameter set generation unit 334, the sound data analysis unit 335, and the analysis result management unit 336 are activated by a program stored in the storage unit 320 and executed by a server 300 that is a computer (electronic computer).

The instruction reception unit 331 accepts the instruction when the user makes a predetermined request via a user interface such as an application software screen or a web screen displayed in the user terminal 200 or via various sensors provided in the hearing device 100.

The user information management unit 332 manages user-related information and performs predetermined processing as necessary. User-related information is, for example, user ID and e-mail address information, and the user ID may be associated with the results of the confirmation test and the analysis result of the sound data, and may be able to be confirmed from the application.

The confirmation test management unit 333 executes a predetermined confirmation test (described later in the flowchart), refers to the results of the confirmation test, and executes a predetermined process (for example, displaying the confirmation test result on the user terminal 200, transmitting the result to the parameter set generation unit 334, etc.).

The parameter set generation unit 334 generates a setting value that increases or decreases the gain (amplification amount) for a plurality of predetermined frequencies (eg, 8 channels and 16 channels) based on the results of the above-described confirmation test and/or the analysis results of the sound data described later.

The sound data analysis unit 335 analyzes the input sound data. Here, the analysis of the sound data is to analyze the frequency of the sound data input using the Fast Fourier Transform, for example, to determine that the noise of a specific frequency (for example, a frequency derived from a location such as a train, an airplane, or a city, or a frequency derived from a source such as a human voice or television) came out stronger than a predetermined reference value. When determined, the determination result may be transmitted to the parameter set generation unit 334. In addition, noise of a specific frequency may be stored by corresponding to each as a hearing mode, and further, it may be configured to manually set the hearing mode by the user.

The analysis result management unit 336 refers to the analysis result of the sound data, performs a predetermined process (for example, displaying the analysis result on the user terminal 200, transmitting the result to the parameter set generation unit 334, and the like).

Flow of <Processing>

Figure 5:
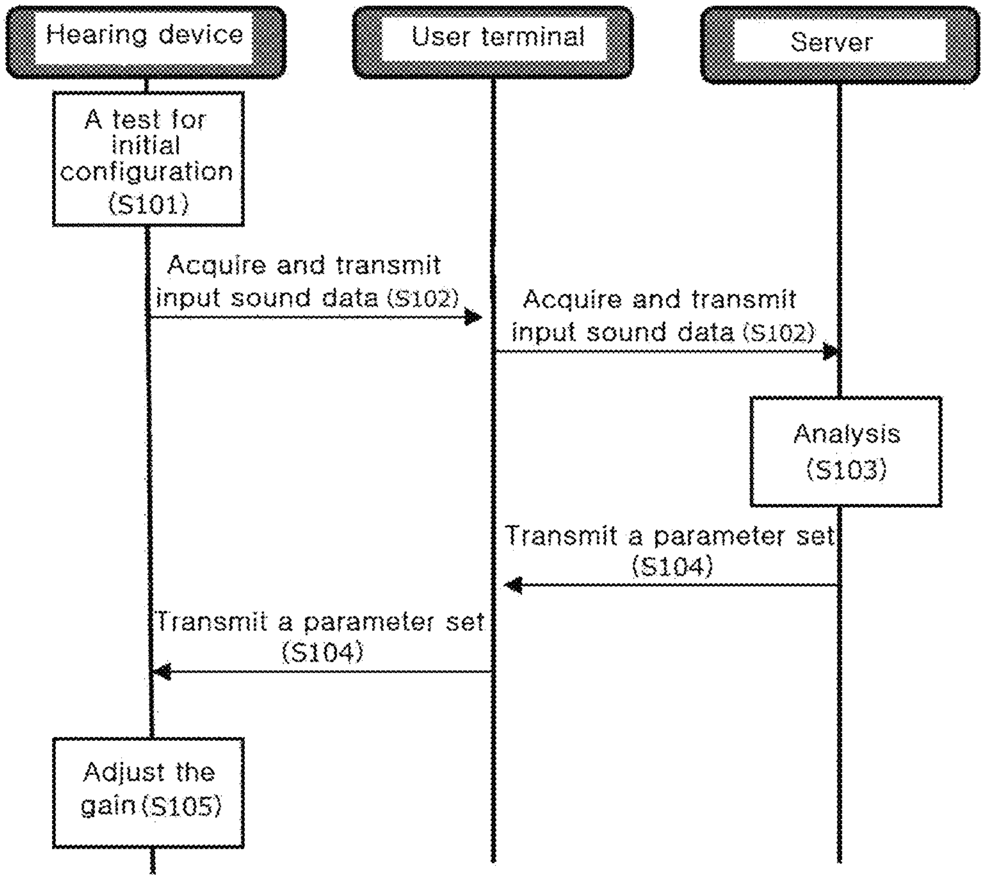
FIG. 5 is an example of a flowchart according to the adjustment method according to the first embodiment of the present invention.

Referring to FIG. 5, a process flow for adjusting the hearing device executed by the system of the first embodiment of the present invention will be described. FIG. 5 is an example of a flowchart according to the method of adjusting the hearing device according to the first embodiment of the present invention. In addition, although the flowchart performs a test for initial setting, the test may be performed at any timing as well as the initial setting, or the test may not be performed depending on the user.

First, before using the hearing device 100, a test for initial configuration is performed (step S101). For example, on an application launched on the user terminal 200, a confirmation test for hearing for each predetermined frequency (eg, 16 channels) (for example, a test described in the fourth embodiment described later, or a test that presses the OK button when a "pea" sound is heard for each frequency), a parameter set is generated based on the test result, The gain (amplification amount) for each frequency is stored in the user terminal 200 as a parameter set, and based on it, for example, the gain (amplification amount) for each frequency of the hearing device is set by DSP.

Next, the hearing device 100 acquires sound data from the first input unit 110 and/or the second input unit 120 and transmits it to the server 300 via the user terminal 200 (step S102).

Next, the server 300 performs analysis of sound data by the sound data analysis unit 335 and generates a parameter set (step S103).

Next, the server 300 transmits a parameter set to the hearing device 100 via the user terminal 200, stores it in the storage unit 132, and further adjusts the gain (amplification amount) for each frequency of the hearing device by, for example, DSP based on the parameter set (step S105). Steps S102-105 are performed every predetermined sample time.

Thereby, by adjusting in real time according to the sound input to the hearing device (especially the sound of the surrounding environment), it is possible to finely adjust the input sound and output it to the user, and the user is always in an easy-to-hear state.

<One Variant of the First Embodiment>

Figure 6:
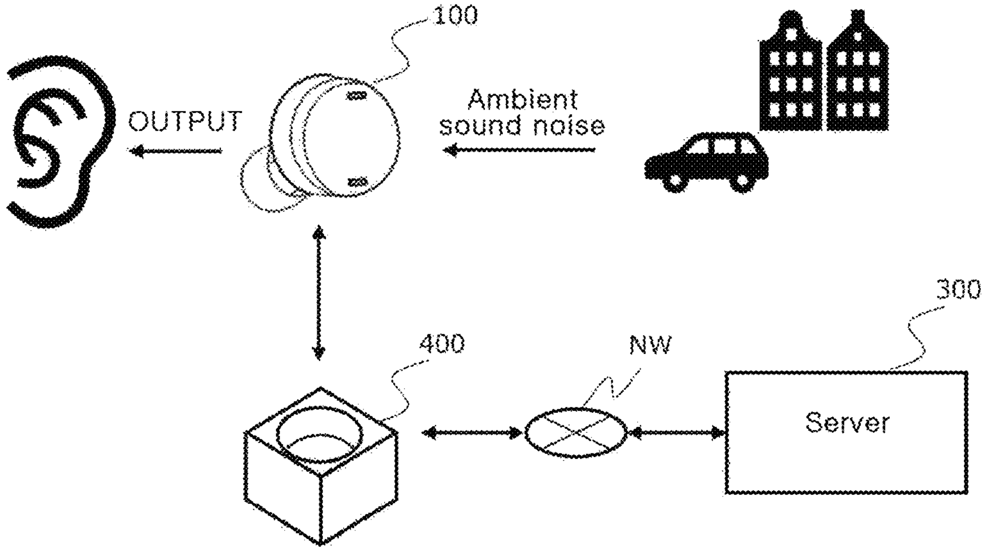
FIG. 6 is a block configuration diagram showing variant 1 of the first embodiment of the present invention.

FIG. 6 is a block configuration diagram showing variant 1 of the first embodiment of the present invention. In variant 1 of the first embodiment, unlike the first embodiment, the hearing device 100 is connected to the server 300 via the battery device 400 and the network NW rather than the user terminal 200. In FIG. 6, as the battery device 400, the hearing device 100 also serves as a function of the case, and shows a configuration that can be charged with built-in recess, but this is not the case.

The battery device 400 is, for example, a SIM card (Subscriber Identity Module Card), and is configured that can be connected to the network NW, and a sound data and parameter set can be transmitted to and from the server 300 instead of the first embodiment of the "user terminal 200".

Thereby, since the network NW connection is possible by the battery device 400, which is frequently carried around to the user, the input sound can be adjusted even if the user terminal 200 is not carried around, and the user's convenience is enhanced. In particular, it is useful for the elderly who have a low ownership rate of the user terminal 200.

<Two Variations of the First Embodiment>

Figure 7:
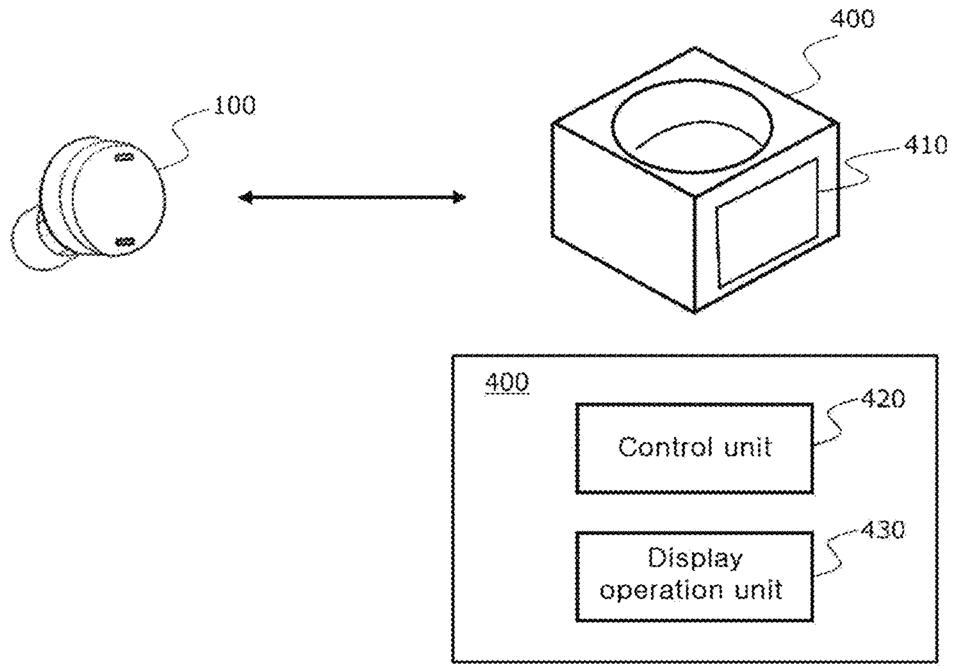
FIG. 7 is a system configuration diagram showing variant 2 of the first embodiment of the present invention.

FIG. 7 is a system configuration diagram showing Variant 2 of the first embodiment of the present invention. In this variant, the battery device 400 shown in FIG. 6 comprises a touch screen 410 that enables a predetermined operation associated with the hearing device 100 by the user. The battery device 400 has a control unit 420 and a display operation unit 430. In the control unit 420, a process executed by the control unit 330 described in the first embodiment can also be executed. Further, the battery device 400 and the hearing device 100 connect to each other via a network including short-range wireless communication. For example, if the user wants to adjust the volume or sound pressure between the sound of the surrounding environment input to the hearing device 100 and the sound (including music) acquired from other devices, adjust the gauge etc. by touch operation on the touch screen 410, or press a specific button from the button indicating several options, You can try to adjust the volume or sound pressure between ambient sound and sound. According to this variant, based on the user operation detected in the display operation unit 430 of the battery device 400, the control unit 420 adjusts the ratio of volume or sound pressure between the ambient sound transmitted from the hearing device 100 and the sound, transmits the adjusted peripheral environmental sound and voice parameter set (setting value) to the hearing device 100, and in the hearing device 100, The above method and other methods generate and output sound data adjusted based on the parameter set. Here, the battery device 400 can also generate sound data with volume or sound pressure adjustment based on a parameter set and transmit it to the hearing device 100.

Thereby, by having a touch screen in the battery device and a control unit for adjusting the volume and the like in the battery device according to the user input, the battery device can be enhanced, including the function that was also set to the user terminal such as a smartphone, and the desired volume or the like can be adjusted without relying on the listening device's resources.

<3 Variations of the First Embodiment>

Figure 8:
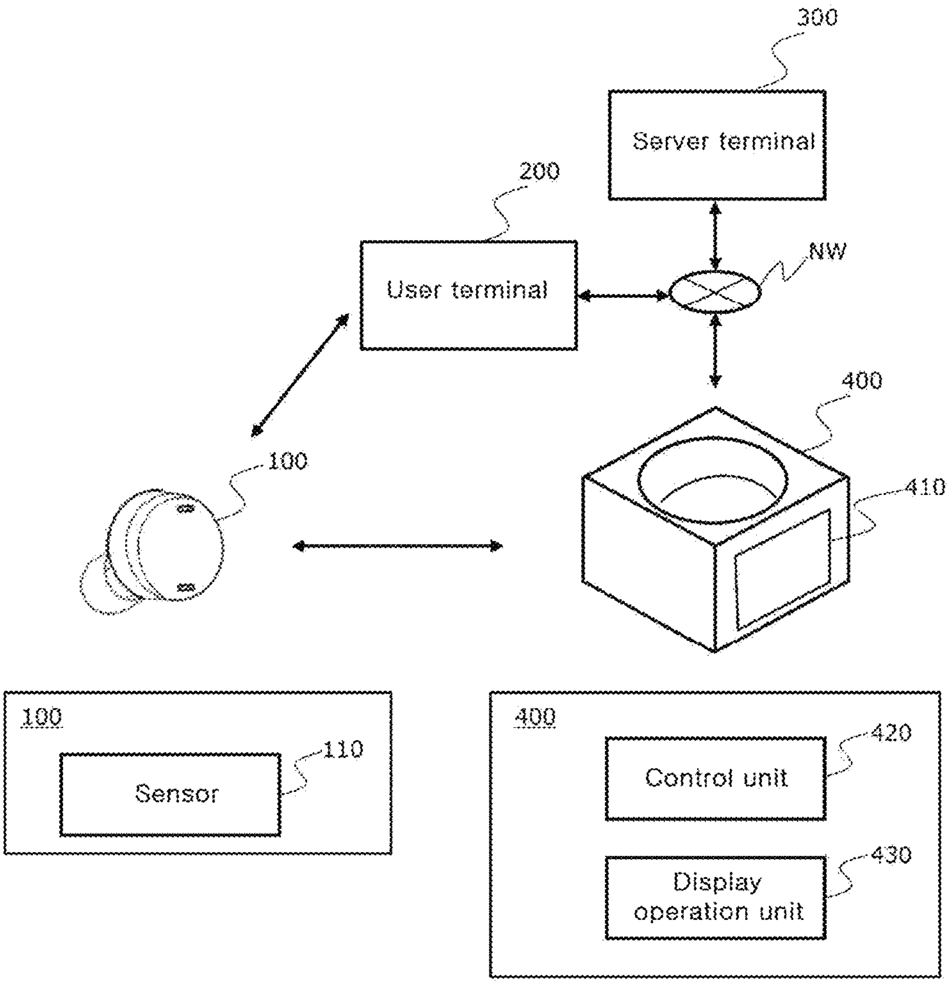
FIG. 8 is a system configuration diagram which shows variant 3 of the first embodiment of the present invention.
Figure 9:
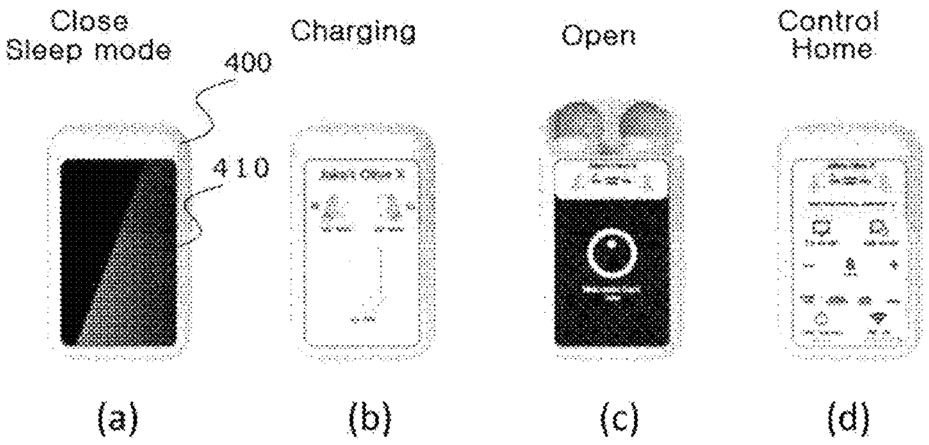
FIG. 9 is a figure which shows the screen example displayed on the battery device according to the variant of the first embodiment of the present invention.

FIG. 8 is a system diagram showing Variant 3 of the first embodiment of the present invention. In this variant, the battery device 400 shown in FIG. 6 comprises a touch screen 410 that enables a predetermined operation associated with the hearing device 100 by the user as shown in FIG. The battery device 400 has a control unit 420 and a display operation unit 430. In the control unit 420, a process executed by the control unit 330 described in the first embodiment can also be executed. The battery device 400 and the hearing device 100 connect to each other via a network including short-range wireless communication and Wi-Fi. The hearing device 100 comprises a sensor 110, and the sensor 110 detects the user's biological information (eg, heartbeat or pulse) and/or exercise information (eg, steps, distance, wake/sleep time, etc.). Here, the hearing device 100 connects to each other via a user terminal 200 such as a smartphone and a near field wireless communication or a Wi-Fi network, and biological information and/or motion information detected by the sensor 110 Can be transmitted to the user terminal 200 each time or periodically. The hearing device 100 can also be transmitted via the user terminal 200 (or via the battery device 400) and further to the server terminal 300 or other storage connected to the user terminal 200 via the network. Thereby, the hearing device 100 can store information as a history on a device having a storage capacity. On the other hand, the hearing device 100 can transmit biological information and/or motion information detected in real time in the sensor 110 to the battery device 400 each time or periodically. The battery device 400 that receives various information can display information on the touch screen 410 by the control unit 420 and the display operation unit 430. Thereby, the user can see various information in real time via the touch screen 410 of the battery device 400. Further, the battery device 400 receives biological information and/motion information stored in the user terminal 200 or the server terminal 300 as statistical data such as average value and transition, and the received statistical data can be displayed on the touch screen 410. According to the system according to this variant, the detected information can be managed by any device and displayed to the user according to the capacity of the data and the content of the data to be displayed.

Thereby, by having a sensor in the hearing device, the biological information of the user who is wearing the hearing device is acquired, and the acquired information can be displayed in real time by having a touch screen in the battery device. On the other hand, by storing data such as biological information that requires storage capacity stored as history on other devices (user terminal and/or server terminal), and displaying it on the touch screen of the battery device as statistical information, the display process can be realized while optimizing the storage and calculation resources.

<Variant 4 of the First Embodiment>

FIG. 10 is a figure showing a screen example displayed on a battery device according to the first variant of the present invention. The battery device 400 comprises a touch screen 410 such as an OLED and LCD that enables a predetermined operation related to the hearing device 100 by the user. As shown in FIG. 10A, when the user stores the hearing device 100 in the battery device 400 for charging and closes the lid, the battery device 400 detects that the hearing device 100 (including for the right ear or for the left ear or both) has been stored, and that the lid has been closed, and as shown in FIG. 10B, the touch screen 410 is The charging status of the right ear hearing device, the hearing device for the left ear, and the battery device 400 is displayed as a gauge, numerical value, or the like. And, as shown in FIG. 10C, when the user opens the lid, removes the hearing device 100, and closes the lid, as shown in FIG. 10(*d*), the battery device 400 detects that the hearing device 100 has been taken out (not stored) and that the lid is closed, and then When it is detected that the hearing device 100 is paired by near field communication or the like, the touch screen 410 displays a control panel for controlling the hearing device 100. As the control panel, a button for adjusting the initial calibration setting, the volume or sound pressure of the voice or ambient sound of the entire hearing device, a feedback cancellation function, a tinnitus reduction function, an equalizer function, and the like can be displayed.

With the above variant, the user can use various functions in, particularly in collaboration with the hearing device 100 alone or the battery device, to enhance convenience.

The above, embodiments pertaining to disclosure have been described, but these can be implemented in various other forms, and various omissions, substitutions, and modifications can be performed. These embodiments and variants as well as those that have been omitted, replaced and modified are included in the technical scope of the claims and their even scope.

REFERENCE SIGNS LIST

100 Hearing Devices
200 User terminals
300 Server equipment
400 Battery Devices
NW Network

The invention claimed is:

1. A hearing system, comprising:

a battery device having a lid that can be opened or closed; and a hearing device that can connected to the batter device via a network and that can be positioned inside the battery device for storage and charging and removed from the battery device for use;

wherein the hearing device has a first input unit for acquiring first sound data from a surrounding environment and a second input unit for acquiring second sound data from another devices, a communication unit that can transmit the first sound data from the first input unit and the second sound data from the second input unit and a storage unit that can receive a parameter set from the battery device, and an output unit that can adjust the first sound data and the second sound data according to the parameter set and output the adjusted first sound data and second sound data as sound to the user;

wherein the battery device can detect whether the lid is closed and whether the hearing device is positioned in the battery device; and wherein the battery device can selectively display one of a control panel for controlling the hearing device and a charging status display based whether the battery device has detected that the lid is closed and the hearing device is positioned in the battery device.

2. The hearing system of claim 1, wherein the battery device includes a touch screen that accepts user input for adjusting the first sound data and the second sound data.

3. The hearing system of claim 1, wherein the battery device includes a control unit for adjusting the first sound data and the second sound data.

4. The hearing system device of claim 1, further comprising a sensor which detects at least one of a biological information of the user and a motion information of the user and transmits the detected at least one of the biological information and the motion information to the battery device.

5. The hearing system of claim 1, wherein the hearing device can connect to at least one of a user terminal and a server terminal via a network, and transmit the detected at least one of the biological information and the motion information to the at least one of the user terminal and the server terminal.

* * * * *